United States Patent Office 2,977,740
Patented Apr. 4, 1961

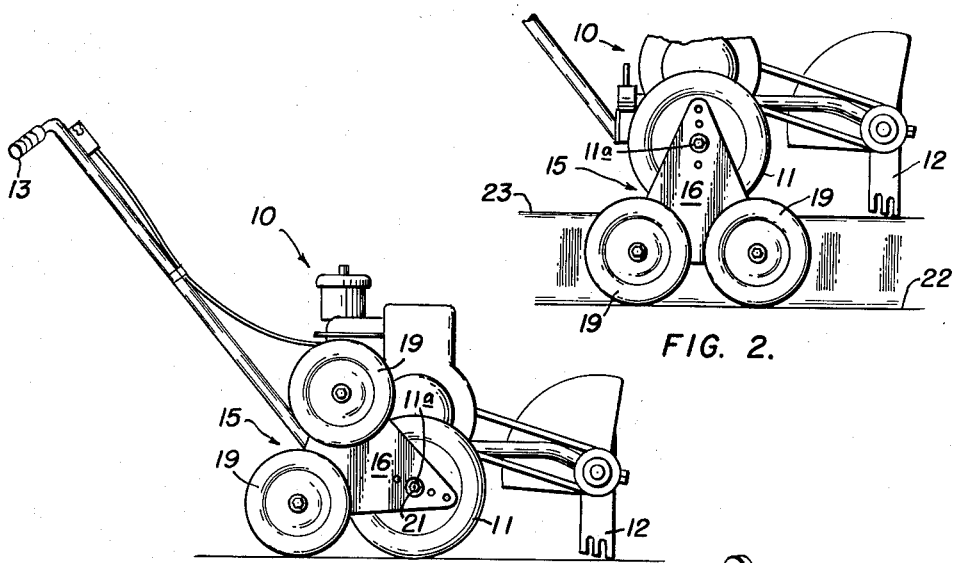
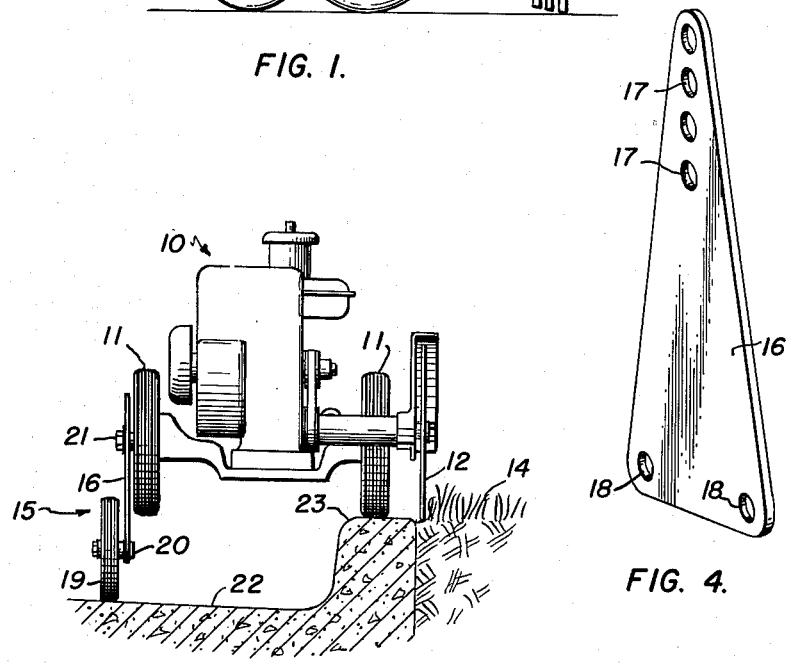

2,977,740

AUXILIARY WHEEL ATTACHMENT FOR POWERED LAWN EDGER

George E. King, 2495 NE. 36th St., Fort Worth, Tex.

Filed Aug. 10, 1959, Ser. No. 832,569

1 Claim. (Cl. 56—25.4)

This invention relates to powered lawn edgers and has reference to an auxiliary wheel support therefor. In lawn edgers of the type referred to, the cutting blade is at one side of the machine and which arrangement permits edging in one direction only with reference to the curb of the street since these machines are designed to roll on the lawn surface. Obviously, there are times when it may be desirable to support the machine on the curb and in the street in order to edge in a direction opposite that for which the machine was designed.

An object of the invention is to provide an auxiliary wheel support for a powered lawn edger on the side thereof opposite the cutting blade and whereby the edger may be suppported on the curb and street along one side of the lawn.

Another object of the invention is to provide an auxiliary wheel support for a lawn edger which is convenient in its use and automatic in its operation; that is, one which is automatically positioned downwardly and in rolling contact with the street by merely extending the side including the auxiliary wheel support outwardly across the curb.

A further object of the invention is to provide an auxiliary wheel support for a powered lawn edger wherein said wheel support is in the form of an attachment and is readily adaptable to many powered lawn edgers now in use.

These and other objects will become apparent from the following description and the accompanying drawing, wherein:

Figure 1 is a side elevation of a gasoline powered lawn edger and showing the present invention mounted thereon in its raised or non-operating position.

Figure 2 is a broken side elevation view similar to Figure 1, but showing the auxiliary wheel support in its lowered position and in rolling contact with the street below the level of the lawn.

Figure 3 is a front elevational piew of Figure 2.

Figure 4 is an enlarged perspective view of the pivoted mounting plate comprising a feature of the invention.

In the drawing, 10 generally designates a gasoline powered lawn edger having a pair of wheels 11, a driven forwardly extending cutting blade 12 and rearwardly extending handles 13, all in the usual manner. In conventional operation, the supporting wheels 11 roll on the surface of the lawn 14 and the cutting blade 12, which operates about a horizontal axis, edges the lawn along a boundary line, such as a curb or sidewalk.

In accordance with the present invention, the auxiliary wheel support 15 is comprised of a triangular member 16, preferably in the form of a plate, and which member has a vertical arrangement of holes 17 in the apex end thereof for attachment to the axle 11a of the wheel 11 on the side of the edger opposite the cutting blade 12. The lower corners of the member 16 are provided with holes 18 for attaching auxiliary wheels 19 which are parallel with the side of the edger 10 and which wheels are mounted on the triangular member 16 by means of axle bolts 20. The apex of the triangular member 16 is connected with the axle 11a of the adjoining edger wheel 11 by removing the retaining nut 21, engaging the plate on said axle in one of the pivot holes 17 and then replacing said nut.

As before stated, the edger 10 is normally supported on the lawn 14 and in order to support one side of the edger on a street surface 22 which is lower than a curb surface 23, the operator merely guides the edger outwardly onto the curb and the auxiliary wheels 19 drop in to contact with the street. While in this position, Figures 2 and 3, edging may be accomplished along the border of the lawn 14 in a direction opposite to that intended by the original edger design. To retract the auxiliary wheels 19 the operator merely guides the edger inwardly over the lawn, causing the auxiliary wheels to come in contact with the side of the curb and thus cause the wheels to raise in the manner illustrated in Figure 1. It is to be understood that the raised position of the wheels 19 will not interfere with edging when the edger 10 is entirely supported on the lawn.

The invention is not limited to the exemplary construction herein shown and described, but may be varied within the scope of the appended claim.

What is claimed is:

An auxiliary wheel support for a powered lawn edger having a cutting blade on one side thereof and a supporting wheel and axle on the side thereof opposite said cutting blade, said axle being transversely disposed with reference to the path of the edger, said auxiliary wheel support comprising a triangular member outwardly of said supporting wheel and parallel therewith, auxiliary wheels mounted on two corners of said triangular member and freely swingable pivot means connecting the remaining corner of said triangular member with said axle of said edger.

References Cited in the file of this patent

UNITED STATES PATENTS

| 1,651,759 | Felton | Dec. 6, 1927 |
| 2,691,264 | Miller | Oct. 12, 1954 |
| 2,734,325 | La Bonte | Feb. 14, 1956 |
| 2,847,813 | Hanson et al. | Aug. 19, 1958 |
| 2,854,804 | Scott | Oct. 7, 1958 |
| 2,855,742 | Copper et al. | Oct. 14, 1958 |
| 2,876,466 | Baldwin | Mar. 10, 1959 |